(12) United States Patent
Koyama

(10) Patent No.: US 9,287,696 B2
(45) Date of Patent: Mar. 15, 2016

(54) PTC DEVICE

(75) Inventor: Hiroyuki Koyama, Narita (JP)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 0 days.

(21) Appl. No.: 14/126,841

(22) PCT Filed: Jun. 14, 2012

(86) PCT No.: PCT/JP2012/065229
§ 371 (c)(1),
(2), (4) Date: Jun. 16, 2014

(87) PCT Pub. No.: WO2012/173183
PCT Pub. Date: Dec. 20, 2012

(65) Prior Publication Data

US 2014/0327994 A1 Nov. 6, 2014

(30) Foreign Application Priority Data

Jun. 17, 2011 (JP) ................................ 2011-135211

(51) Int. Cl.
*H02H 5/04* (2006.01)
*H02H 3/08* (2006.01)
*H01C 7/02* (2006.01)

(52) U.S. Cl.
CPC . *H02H 3/08* (2013.01); *H01C 7/021* (2013.01)

(58) Field of Classification Search
CPC .................................. H02H 3/08; H01C 7/021
USPC .................................................. 361/93.1, 106
See application file for complete search history.

(56) References Cited

U.S. PATENT DOCUMENTS 8,164,415 B2    4/2012   Tanaka et al.
2002/0162214 A1*  11/2002  Hetherton et al. ............... 29/623

(Continued)

FOREIGN PATENT DOCUMENTS

JP          09-266103 A     10/1997
JP          10-208902 A     8/1998

(Continued)

OTHER PUBLICATIONS

International Search Report for International Application No. PCT/JP2012/065229, mailed Sep. 18, 2012 with translation.

(Continued)

*Primary Examiner* — Ronald W Leja

(57) ABSTRACT

The present invention provides a PTC device having the larger rated current and/or the larger rated voltage. The PTC device includes a plurality of laminar PTC components which are laminated via an insulation layer and has a first end portion and a second end portion. Each PTC component includes a PTC element which is defined by a first main surface and a second main surface which face to each other, and is terminated at the first end portion and the second end portion, as well as a first laminar electrode which is disposed on the first main surface and a second laminar electrode which is disposed on the second main surface, The PTC device has a first side electrode which is common to the plurality of the PTC components at the first end portion and a second side electrode which is common to the plurality of PTC components at the second end portion, The first laminar electrode of each PTC component extends to the first end portion; the second laminar electrode of each PTC component extends to the second end portion. As a result, the plurality of PTC components are connected in parallel with each other between the first side electrode and the second side electrode, The plurality of the PTC components in the laminated state are such that the first laminar electrode is positioned as an outer most first electrode at one outermost portion of the laminated plurality of the PTC components and the second laminar electrode is positioned as the outermost second electrode at the other outermost portion of the laminated plurality of the PTC component. A first electrically conductive element is positioned on the outside of the outermost first electrode and a second electrically conductive element is positioned on the outside of the outermost second electrode; the first electrically conductive element is electrically connected, directly or indirectly, to the first side electrode; and the second electrically conductive element is electrically connected, directly or indirectly, to the second side electrode.

15 Claims, 3 Drawing Sheets

(56) References Cited

U.S. PATENT DOCUMENTS

| | | | |
|---|---|---|---|
| 2004/0090304 A1 | 5/2004 | Hetherton et al. | |
| 2006/0176675 A1* | 8/2006 | Bourns | H01C 1/1406 361/780 |
| 2007/0045287 A1* | 3/2007 | Li | H01C 7/02 219/505 |
| 2011/0170221 A1* | 7/2011 | Koyama | 361/93.8 |
| 2011/0175700 A1 | 7/2011 | Bourns et al. | |
| 2014/0327994 A1* | 11/2014 | Koyama | H02H 3/08 361/93.1 |
| 2015/0029630 A1* | 1/2015 | Usui | H02H 3/085 361/103 |

FOREIGN PATENT DOCUMENTS

| | | |
|---|---|---|
| JP | 2003-515245 A | 4/2003 |
| JP | 2005-513763 A | 5/2005 |
| JP | 2009-533880 A | 9/2009 |
| WO | WO-2007/052790 A1 | 5/2007 |

OTHER PUBLICATIONS

Written Opinion for International Application No. PCT/JP2012/065229, dated Sep. 6, 2012 with translation.

* cited by examiner

PTC DEVICE

FIELD OF THE INVENTION

The present invention relates to a PTC device wherein a plurality of PTC components are laminated while connected in a parallel-connected state, in particular to a PTC device which comprises a plurality of the PTC components which are connected electrically in parallel and laminated, and electrically conductive elements on both sides thereof.

BACKGROUND OF THE INVENTION

A PTC device is widely used as a protection device to protect an electrical element constituting an electrical apparatus, for example a secondary battery cell, or a circuit constituting an electrical apparatus, when an excessive current flows through various electrical apparatuses. The PTC device is also widely used to interrupt an electrical current flowing through the electrical apparatus when the electrical element fails, and as a result, a temperature of the electrical apparatus rises to an abnormally high temperature.

An example of such a PTC device is shown in FIG. 3 in a schematic cross-sectional view. The PTC device 110 comprises a PTC component 112 and leads 114 and 116 respectively disposed on both sides thereof. The illustrated PTC device 110 is disposed, for example, in a charge/discharge circuit of a secondary battery cell. The PTC device is used as a circuit protection device to interrupt an excessive current flow when an excessive current flows through the circuit. In the illustrated embodiment, the lead 114 is electrically connected to a substrate having the protection circuit, and the lead 116 is electrically connected to the secondary battery cell.

The PTC component 112 comprises a PTC element 118 made of an electrically conductive PTC composition and metal electrodes 120 and 122 respectively disposed on both sides thereof, and these are typically formed to be integral by thermal compression.

The metal electrode 120 of the PTC component 112 is electrically connected to the substrate-side lead 114 with a solder paste 124 disposed therebetween. The metal electrode 122 is electrically connected to the cell-side lead 116 with a solder paste 124 disposed therebetween.

To produce the PTC device, for example, the solder paste 124 is disposed on the substrate-side lead 114, then the PTC component 112 is disposed such that the metal electrode 120 is positioned the solder paste 124. Then, the solder paste 124 is disposed on the metal electrode 122 and the cell-side lead 116 is disposed thereon to form an assembly. Then, the assembly is passed through a reflow furnace to melt the solder paste, and then the molten solder paste is cooled to be solidified to obtain the PTC device.

After obtaining the PTC device by passing the assembly through the reflow furnace to integrally connect with the solder paste, an oxygen barrier layer 126 is formed on a side portion of the PTC component. In order to do this, an epoxy resin is applied to the side portion of the PTC device while holding the obtained device by another jig to form a coating layer, and the coating layer is cured (or hardened) to form the oxygen barrier layer 126.

International Patent Publication No. WO2007/052790 is a prior patent reference.

SUMMARY OF THE INVENTION

Because the above-described PTC device only has a single PTC component, if a current which flows through a circuit or an electrical element disposed therein which is to be protected and/or a voltage which is applied to a circuit or an electrical element disposed therein which is to be protected is excessively large, such PTC device cannot be used.

In other words, a rated current and/or a rated voltage of the above-described PTC device may not necessarily be sufficient. Therefore, the problem to be solved by the present invention is to provide a PTC device having a larger rated current and/or a larger rated voltage.

Therefore, in the first aspect, the present invention provides a PTC device which comprises a plurality of laminar PTC components which are laminated via an insulation layer and has a first end portion and a second end portion, wherein the PTC device is characterized in that:

each PTC component comprises a PTC element which is defined by a first main surface and a second main surface facing to each other, and which is terminated at the first end portion and the second end portion; and a first laminar electrode which is disposed on the first main surface and a second laminar electrode which is disposed on the second main surface;

the PTC device has a first side electrode which is common to a plurality of the PTC components at the first end portion and a second side electrode which is common to a plurality of the PTC components at the second end portion;

the first laminar electrode of each PTC component extends to the first end portion (so that the first laminar electrode is connected electrically to the first side electrode) (without reaching the second end portion);

the second laminar electrode of each PTC component extends to the second end portion (so that the second laminar electrode is connected electrically to the second side electrode) (without reaching the first end portion);

as a result, a plurality of the PTC components (more strictly, the PTC elements which constitute the PTC components) are connected in parallel with each other between the first side electrode and the second side electrode;

the plurality of the PTC components in the laminated state such that the first laminar electrode is positioned as an outermost first electrode at one outermost portion of the laminated plurality of the PTC components and the second laminar electrode is positioned as an outermost second electrode at the other outermost portion of the laminated plurality of the PTC components;

a first electrically conductive element is positioned on the outside of the outermost first electrode and a second electrically conductive element is positioned on the outside of the outermost second electrode;

the first electrically conductive element is electrically connected, directly or indirectly, to the first side electrode; and the second electrically conductive element is electrically connected, directly or indirectly, to the second side electrode.

In one embodiment of the PTC device of the present invention, the first electrically conductive element is a metal lead which is connected to the first laminar electrode of the PTC component as the outermost first electrode with an electrically conductive adhesive disposed therebetween. This metal lead is preferably positioned on and over the entire of the outermost first electrode. In this case, the electrically conductive adhesive may be present on at least a part of the outermost first electrode, and an insulation material may be present on the other part of the outermost first electrode. In this case, the insulation material is preferably present around the periphery of the electrically conductive adhesive. In other words, a part of the insulation material is preferably adjacent to at least a part of the periphery of the electrically conductive adhesive. Also, in the cross-section shown in FIG. 1 described below, it is more preferable that the insulation material is present on both sides of the electrically conductive material, and particularly preferable that it substantially surrounds the whole of the periphery of the insulation material. It is noted that the first electrically conductive element may be electrically connected to the first side electrode, but is not connected electrically to the second side electrode.

It is noted that in the present specification, the term "electrically conductive adhesive" means an adhesive having a function of forming an electrically conductive path in addition to an adhesion function. In one embodiment, the electrically conductive adhesive comprises a resin and an electrically conductive material. The electrically conductive material is in the form of an electrically conductive filler such as solder particles. An example of the electrically conductive material includes a filler made of a solder material. The filler may be solder particles. More specifically, the electrically conductive adhesive may be a solder paste (for example, a solder paste containing an epoxy resin). The insulation material contains, for example, a curable resin and its form can be stabilized by being heated and cured depending on its property. More specifically, an epoxy resin may be used as the insulation material.

As described above, the embodiment wherein a part of the insulation material is adjacent to a part of the electrically conductive adhesive is particularly useful as follows. When the electrically conductive adhesive is heated, as a result, at least one of the electrically conductive material and the resin becomes in a molten state and flows out from the position where the electrically conductive adhesive was disposed so that an unintended conductive path may have been formed, the part of the insulation material can function as a weir and stem the flow.

In one embodiment of the PTC device of the present invention, the second electrically conductive element is a metal layer which is formed by plating on the second laminar electrode of the PTC component as the outermost second electrode. This metal layer is preferably positioned on and over substantially the entire of the outermost second electrode. The second electrically conductive element may be electrically connected to the second side electrode but is not electrically connected to the first side electrode.

In one embodiment of the PTC device of the present invention, the insulation layer which is positioned between the PTC components is a prepreg (which is in the state after having been cured as to the PTC device). This insulation layer is preferably present between the PTC components which are adjacent to each other over substantially the entire of the main surfaces thereof.

In the PTC device of the present invention, particularly preferably, the PTC component is a so-called polymer PTC component which comprises a PTC element formed from a polymer composition wherein an electrically conductive filler is dispersed within a polymer material. The PTC element is preferably a laminar PTC element. Such a polymeric PTC component per se is well-known. Also, the electrically conductive element may be formed of any appropriate material, and its form is preferably laminar. The electrically conductive element may be, for example, in the form of a metal sheet, strip, foil, and the like. In another embodiment, the electrically conductive element may be a metal plated layer.

In the second aspect, the present invention provides an electrical apparatus, for example a lithium ion battery or a lithium polymer battery, comprising the PTC device of the present invention which is described above or below. In this case, the PTC device of the present invention can function as a circuit protection device in the electrical apparatus.

In the PTC device of the present invention, the PTC components are connected in parallel in their laminated state. As a result, a rated current and/or a rated voltage of this PTC device become larger. Also, since the first electrically conductive element is positioned above the outermost first electrode, a prescribed electrical element (e.g., an independent terminal, lead or pad, or a terminal, a lead or pad of an electrical component (for example, a capacitor, a resistor, and the like)) can be directly connected on the PTC device. As a result, since there is no necessity of an electrical element, such as a lead, protruding outwardly from the PTC device itself, a space required for the connection between the PTC device and the electrical element becomes minimal.

With the PTC device of the present invention, since the required space can be minimized as described above, PTC components with a relatively small rated current and/or rated voltage can be laminated to obtain a PTC device with a prescribed rated current and/or rated voltage. For example, a PTC device having a prescribed rated current and/or rated voltage can be constituted by laminating PTC components wherein the electrically conductive filler which is contained in the polymer composition composing the PTC element is carbon black. In this case, since oxidation of the carbon black is substantially not a problem, there is an advantage that the formation of an oxygen barrier layer as described above may be omitted. Needless to say, by stacking a plurality of PTC components having a relatively larger rated current and/or rated voltage (for example, a PTC component which comprises a PTC element in which an electrically conductive filler such as nickel, nickel alloy, etc. is used), a PTC device having a further larger rated current and/or rated voltage may be made.

Further, in the embodiment of the PTC device according to the present invention wherein a part of the insulation material is adjacent to at least a part of the periphery of the electrically conductive adhesive part, when the PTC device is electrically connected to an electrical element such as other lead, even if the first electrically conductive lead is heated in order to connect the first electrically conductive element to said other lead by resistance welding or soldering, the insulation material can prevent the molten conductive adhesive from flowing out or projecting out. As a result, it is prevented as much as possible that the electrically conductive adhesive spreads and forms an unintended conductive path.

DETAILED DESCRIPTION OF THE INVENTION

Figure 1:
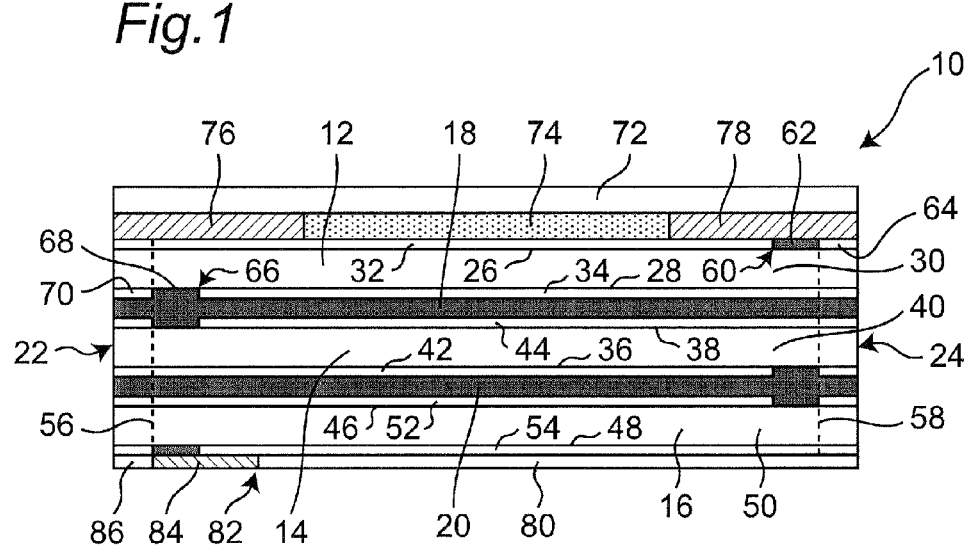
FIG. 1 schematically shows a structure of a PTC device according to the present invention in its cross-section view.
Figure 2:
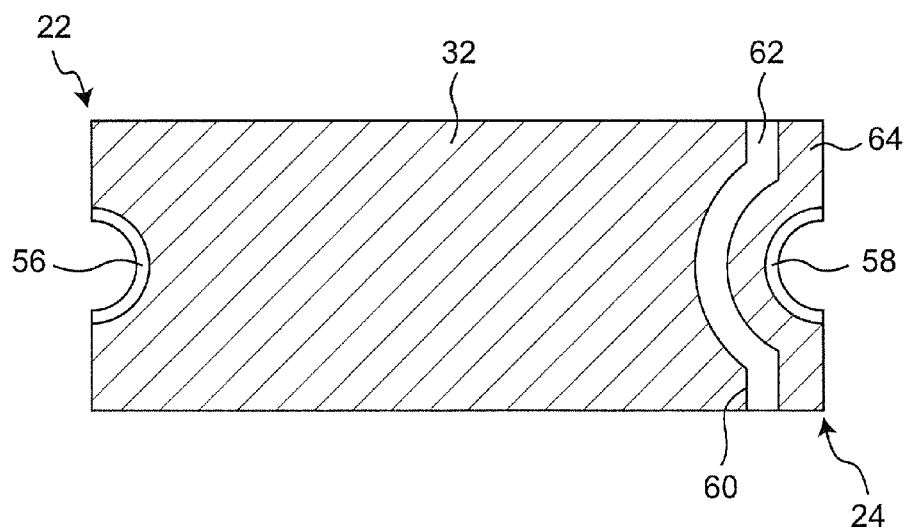
FIG. 2 schematically shows the PTC device of the present invention as shown in FIG. 1 whose upper elements are removed to expose the outermost first electrode in its plan view when seeing from the above of the PTC device.
Figure 3:
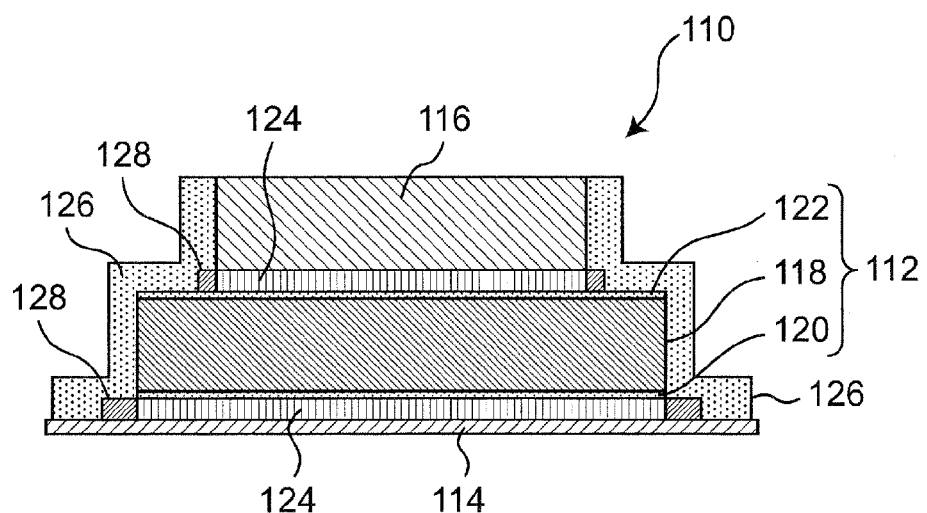
FIG. 3 schematically shows a structure of a conventional PTC device in its cross-section view.

Next, the PTC device of the present invention will be described in detail with reference to the accompanied drawings. FIG. 1 schematically shows the structure of a PTC device of the present invention in its cross-sectional view so that its internal structure can be seen, and FIG. 2 schematically shows the PTC device shown in FIG. 1 wherein the elements positioned above the outermost first electrode are removed so as to expose the outermost first electrode when seeing from the above of the PTC device. The illustrated PTC device 10 comprises three laminated PTC components 12, 14, and 16, as an example of the plurality. These PTC components are laminated via insulation layers 18 and 20. This PTC device comprises a first end portion 22 and a second end portion 24. It is noted that the "plurality" may be any appropriate number. Though an appropriate number may be selected depending on the desired rated current and/or rated voltage, usually the number is at least two, for example, three or more, preferably four or more, and more preferably five or more.

Each PTC component comprises a PTC element which is defined by opposing a first main surface and a second main surface, and terminates at the first end portion and the second section; and a first laminar electrode which is disposed on the first main surface and a second laminar electrode which is disposed on the second main surface.

In other words, the PTC component 12 comprises a PTC element 30 which is defined by a first main surface 26 and a second main surface 28, and terminates at the first end portion 22 and the second section 24; and a first laminar electrode 32 which is disposed on the first main surface 26 and a second laminar electrode 34 which is disposed on the second main surface 28. The PTC component 14 is comprises a PTC element 40 which defined by a first main surface 36 and a second main surface 38, and terminates at the first end portion 22 and the second section 24; and a first laminar electrode 42 which is disposed on the first main surface 36 and a second laminar electrode 44 which is disposed on the second main surface 38. The PTC component 16 comprises a PTC element 50 which is defined by a first main surface 46 and a second main surface 48, and terminates with the first end portion 22 and the second section 24; and a first laminar electrode 52 which is disposed on the first main surface 46 and a second laminar electrode 54 which is disposed on the second main surface 48.

As can be easily understood, in the PTC device 10 of the present invention shown in FIG. 1 which comprises a plurality of the PTC components 12, 14, and 16 in the laminated state, the first laminar electrode 26 on one outermost section is positioned as the outermost first electrode, and the second laminar electrode 54 on the other outermost section is positioned as the outermost second electrode.

The PTC device 10 has a first side electrode 56 which is common to a plurality of the PTC components, strictly, the first laminar electrodes thereof at the first end portion 22 and a second side electrode 58 which is common to a plurality of the PTC components, strictly, the second laminar electrodes thereof at the second end portion 24. It is noted that since each of these side electrodes is provided in a vertical direction in the drawing is formed at a position where a portion of each end of the laminated PTC components is cut off, it cannot be directly seen in FIG. 1 which is a cross-section view and it is shown schematically with a dotted line.

In the illustrated embodiment, the first laminar electrodes 32, 42, and 52 of the PTC components are in contact electrically with the first side electrode 56, and the second laminar electrodes 34, 44, and 54 of the PTC components are in contact electrically with the second side electrode 56. As a result, a plurality of the PTC components 12, 14, and 16, strictly, the PTC elements 30, 40, and 50 are electrically connected in parallel between the first side electrode 56 and the second side electrode 58. It is noted that as long as the first laminar electrodes are connected to the first side electrode and the second laminar electrodes are connected to the second side electrode, the orientation of the PTC component is not particularly limited, and for example, the first laminar electrode may be positioned at the top and the second laminar electrode at the bottom, or vice versa.

It is noted that in the illustrated embodiment, the first laminar electrode 32 terminates at a position (point 60) before the second end portion 24. An insulation material part 62 is present at the right side of the first laminar electrode 32. An electrode piece 64 which is formed of the same material as the first laminar electrode 32 is present at the right side of the insulation material part 62. Also, the second laminar electrode 34 terminates at a position (point 66) before the first end portion 22. An insulation material part 68 is present at the left side of the second laminar electrode 34. An electrode piece 70 which is formed of the same material as the second laminar electrode 34 is present at the left side of the insulation material part 68. As a result, the first laminar electrode 32 and the electrode piece 64 are electrically insulated from each other, and the second laminar electrode 34 and the electrode piece 70 are electrically insulated from each other. Similarly, as to the other PTC components 14 and 16, the first laminar electrode terminates before the second end portion 24 and is not connected to the second side electrode 58, and the second laminar electrode terminates before the first end portion 22 and is not connected to the first side electrode 56.

In the PTC device 10 of the present invention, the above described electrode piece (for example, elements 64, 70, etc.) does not serve a particular function, and is a section which is formed as a result of efficiently conducting electrically connecting the PTC components in parallel by etching as described below after laminating the PTC components each having a laminar electrode material (for example, a metal foil) on both entire main surfaces of the PTC element in producing the PTC device. Therefore, if there is no particular problem, the element corresponding to such electrode piece may be omitted, or in another embodiment, it may be present.

More specific explanations are as follows with reference to a PTC component 12 as an example. In order to electrically connect only the first laminar electrode 32 to the first side electrode 56 and electrically connect only the second laminar electrode 34 to the second side electrode 58, it is necessary that the laminar electrode which is positioned on the main surface of the PTC element 30 extends to one end but does not reach the other end. To achieve this, it is necessary to remove a portion of the laminar electrode material at a portion (the point 60 or 66 in FIG. 1) before said other end. This removal is preferably performed, for example, by using etching to remove the electrode material in the parts corresponding to the elements 62 and 68.

As a result, as shown in FIG. 2 which corresponds to a view seen from the above of the first laminar electrode 32 shown in FIG. 1, the laminar electrode 32 extends to the first end portion 22, i.e. it is connected to the first side electrode, and on the other hand, the laminar electrode 32 extends to before the second end portion 24 but is electrically insulated from the electrode piece 64, i.e. it is not connected to the second side electrode. Therefore, the first laminar electrode 32 does not reach the second end portion 24. The same applies to the second laminar electrode 34, but the left and right are exchanged with each other from the state shown in FIG. 2. The same applies to the other PTC components 14 and 16, and as a result, each first laminar electrode extends to the first end portion 22 without reaching the second end portion 24, and each second laminar electrode extends to the second end portion 24 without reaching the first end portion 22.

Such first laminar electrodes are connected to the first side electrode 56 at the first end portion and such second laminar electrodes are connected to the second side electrode 58 at the first end portion. In other words, the first side electrode 56 is a side electrode common to the PTC components 12, 14, and 16, in more detail, the first laminar electrodes 32, 42, and 52 of these PTC components at the first end portion 22, and the second side electrode 58 is a side electrode common to PTC components 12, 14, and 16, in more details the second laminar electrodes 34, 44, and 54 of these PTC components at the second end portion 24.

In the illustrated PTC device 10 of the present invention, a first electrically conductive element 72 is positioned on the outside of the first laminar electrode 32 as the outermost first electrode. In the illustrated embodiment, the first electrically conductive element 72 is electrically connected to the outermost first electrode 32 via an electrically conductive adhesive layer 74 provided thereon. Parts 76 and 78 of an insulation material (for example, solder resist) are provided on both sides (right side and left side) of the electrically conductive adhesive layer 74. Since the outermost first electrode 32 is electrically connected to the first side electrode 56, the first electrically conductive element 72 is indirectly connected electrically to the first side electrode 56 via the electrically conductive adhesive layer 74 and the outermost first electrode 32. In another embodiment, the left end of the first electrically conductive element 72 and the first side electrode 56 may be directly connected electrically. In a further embodiment, the electrically conductive adhesive layer 74 and the insulation material parts 76 and 78 may be omitted, and the first electrically conductive element 72 may be directly connected electrically to the outermost first electrode 32. In this case, it is necessary that the first electrically conductive element 72 is not in contact electrically with the second side electrode 58. For example, as described below with respect to the second electrically conductive element 80, an insulation material part may be provided on a part of the first electrically conductive element 80. For example, as described below, a plated layer 72 may be provided in advance on the laminar electrode 32.

As described above, in a preferred embodiment, the PTC device of the present invention has a part of an insulation material which is present adjacent to at least a portion of the periphery of the electrically conductive adhesive layer part. For example, as illustrated, the parts 76 and 78 of the insulation material are adjacent to both side of the electrically conductive adhesive layer 74 in the cross-section of the PTC device. For example, it is preferable that the insulation material 76 and/or 78 are present along the entire in a depth-direction (a direction perpendicular to the sheet on which FIG. 1 is drawn) of a part 74 of the electrically conductive adhesive shown in FIG. 1. It is noted that the term "adjacent" is used to cover both of the state wherein two subject elements, i.e. a part of the electrically conductive adhesive layer and a part of the insulation material are in contact with each other, as well as the state wherein there is a gap (normally a narrow gap) therebetween. In a particularly preferred embodiment, an electrically conductive adhesive layer having an appropriate shape (for example, disk, rectangular, dot) and size is disposed on the laminar electrode 32 in FIG. 2 described below, and the insulation material is disposed so as to surround substantially the whole of the periphery of the electrically conductive adhesive layer. For example, the electrically conductive adhesive layer and the insulation material are disposed by using screen printing technology, then the insulation material is cured (or solidified), for example, by heating depending on the property of the insulation material if necessary so as to stabilize the form of the insulation material, then the first electrically conductive element 72 is disposed on the electrically conductive adhesive layer and the insulation material followed by heating and cooling depending on the property of the electrically conductive adhesive, thereby allowing the first electrically conductive element 72 to be disposed on and connected to the outside of the outermost first electrode 32 and forming a conductive path therebetween.

When there is a part of the insulation material as described above, the insulation material can prevent as much as possible the formation of an unintended conductive path by the first electrically conductive element when it is excessively heated so that the electrically conductive adhesive is melted to be fluidized and acquiring fluidity which results in that the molten conductive adhesive flows out to spread. As a result, when the part of the insulation material is provided on the PTC device as described above, the thickness of the first electrically conductive element can be made thinner. For example, the thickness of the first electrically conductive element may be made 0.3 mm or less, and in a preferred embodiment, it may be 0.1 mm or less, thereby allowing the overall thickness (i.e. the dimension in the vertical direction (or up and down direction) in FIG. 1) to be smaller.

In the illustrated PTC device 10 of the present invention, the second electrically conductive element 80 is positioned outside of the second laminar electrode 54 as the outermost second electrode. In the illustrated embodiment, the second electrically conductive element 80 is disposed directly in contact with the second laminar electrode 54 as the outermost second electrode. For example, the disposition may be performed by resistance welding. It is noted that in this case, the second electrically conductive element 80 terminates at a location (point 82) before the first end portion 22 so that the second electrically conductive element 80 does not extend to the first end portion 22, an insulation material part 84 is present at the left-side of the point 82. In this case, a small piece 86 which is formed from the same material as that of the second electrically conductive element 80 may be present at the left-side of the insulation material part 84, and it prevents the electrical connection with the first side electrode 56.

As illustrated, the second electrically conductive element 80 may be electrically connected directly to the second side electrode 58 while, in another embodiment, the second electrically conductive element 80 may not be electrically connected directly to the second side electrode 58 since the outermost second electrode 54 is electrically connected to the second side electrode 58. In other words, in the latter embodiment, the second electrically conductive element 80 is electrically connected indirectly to the second side electrode 58 via the outermost second laminar electrode 54.

In one embodiment of the PTC device of the present invention, the first electrically conductive element 72 is a metal sheet (or a metal strip or a metal foil) as a metal lead which is connected to the first laminar electrode 32 as the outermost first electrode of the PTC component by means of the electrically conductive adhesive layer 74 which is positioned therebetween. As shown in FIG. 1, this metal lead is preferably positioned above the entire of the outermost first electrode 32. In this case, the electrically conductive adhesive layer 74 is present on at least a part of the outermost first electrode 32, and the insulation material parts 76 and 78 may be present on the other parts of the outermost first electrode 32 as shown in FIG. 1. The first electrically conductive element 72 may be electrically connected to the first side electrode 56 while it is not electrically connected to the second side electrode 58. It is noted that, in one embodiment, it is preferable that the first electrically conductive element 72 does not protrude outwardly from the outermost first electrode 32 and is present inside thereof or they are substantially overlapped with each other. Also, in another embodiment, it is preferable that the second electrically conductive element 80 does not protrude outwardly from the outermost second electrode 54 and is present inside thereof or they are substantially overlapped with each other. In a further another embodiment, the characteristic of these two embodiments may be simultaneously met. For example, as shown in FIG. 1, the profile of the electrically conductive elements and the profile of the outermost electrode on the both sides may be substantively overlapped.

In one embodiment of the PTC device according to the present invention, the second electrically conductive element 80 is a metal plated layer which is formed by plating on the second laminar electrode 54 as the outermost second electrode of the PTC component 16. As shown in FIG. 1, this metal plated layer is preferably positioned above substantially the entire of the outermost second electrode 54. The second electrically conductive element 80 may be electrically connected to the second side electrode 58, but is not electrically connected to the first side electrode 56 owing to the presence of the insulation material part 84.

As can be easily understood, it is noted that the above described metal lead as the first electrically conductive element may be used as the second electrically conductive element, and the metal plated layer as the second electrically conductive element may be used as the second electrically conductive element. Further, the both electrically conductive elements may be the metal leads or they may be the metal plated layers. When the metal plated layer is used, the laminar electrode which is positioned on one of the main surfaces of the PTC component which surface is located at the outermost may have the metal plated layer.

In the PTC device of the present invention, the insulation layer may be formed from any preferable material. In one embodiment, it is formed from an insulating resin, and in another embodiment, it is formed from an insulation resin and other insulation materials (e.g., glass or ceramic, and the like of a fibrous material or granular material), and for example, from a prepreg. As the above described insulation resin, it is preferable to use a curable resin, a resin which is cured by heat, UV ray, radiation, and for example, an epoxy resin. Needless to say, the curable resin is in the state after being cured in the PTC device. The insulation layer also enters the gap between the laminar electrode of the PTC component and the electrode piece as above described to form the insulation material part (for example parts 62 and 66).

For example, the PTC device of the present invention as described above may be produced, as follows: a PTC component precursor sheet (also called a "plaque") having metal foils on both main surfaces of a PTC element is prepared; the predetermined sections of the metal foil which correspond to the insulation material parts 62 and 66 are removed by etching those sections; and cylindrical parts on the side surfaces of which the side electrodes 56 and 58 are formed (as easily understood, two parts corresponding to the illustrated semi-cylindrical parts 56 or 58 form a cylindrical part when they are facing with being adjacent to each other) are perforated at the prescribed locations respectively to form an aggregate of the PTC components in which many PTC components are arranged to be adjacent to one another. Also, a PTC precursor sheet of which one main surface has a laminar electrode having a metal plated layer is similarly prepared, etched, and similarly perforated to form other aggregate of the PTC components.

These aggregates are divided into separate PTC components (as a result of which, the cylindrical parts are divided into two adjacent semi-cylindrical sections); and as illustrated, a plurality of the PTC components are laminated via the prepreg between then which is to be the insulation layer. It is noted that for the lowest PTC component (for example, the PTC component 16 in FIG. 1), the PTC component which is prepared from the latter aggregate described above is used, while for the other PTC components, the PTC component which is prepared from the former aggregate described above is used. The laminated assembly of the PTC components and the prepregs which is formed by laminating is compressed under heat, and the side electrodes are formed on the semi-cylindrical parts, for example, by coating with an electrically conductive paste or by electric plating. Then, after forming the electrically conductive adhesive layer 72 and the insulation material parts 74 and 76 on the outside of the outermost first electrode 32, the metal lead 72 as the first electrically conductive element is bonded to obtain the PTC device of the present invention (for example, the PTC device shown in FIG. 1).

Since the PTC device of the present invention has the electrically conductive element on the outside of the outermost electrode which is positioned on each side of the PTC device, and other electrical element may be directly connected to such electrically conductive element, there is an advantage in that the space required for such connections is minimized. It is noted that an oxygen barrier layer may be formed on a side of the above described PTC device according the present invention (particularly, an exposed side thereof which is likely to be affected by oxygen) for example by applying an epoxy resin such side to forming a coating layer followed by curing (or hardening) the coating layer.

This application claims a priority based on Japanese Patent Application No. 2011-135211, filed on Jun. 17, 2011 and titled as "PTC Device", the entire contents of which are incorporated herein by reference.

The element reference numbers are: 10—PTC device; 12, 14, 16—PTC component; 18, 20—insulation layer; 22—first end portion; 24—second end portion; 26—first main surface; 28—second main surface; 30—PTC element; 32—first laminar electrode; 34—second laminar electrode; 36—first main surface; 38—second main surface; 40—PTC element; 42—first laminar electrode; 44—second laminar electrode; 46—first main surface; 48—second main surface; 50—PTC element; 52—first laminar electrode; 54—second laminar electrode; 56—first side electrode; 58—second side electrode; 62—insulation material part; 64—electrode piece; 68—insulation material part; 70 electrode piece; 72—first electrically conductive element; 74—electrically conductive adhesive layer; 76, 78—insulation material part; 80—second electrically conductive element; 84—insulation material part; 86—small piece; 110—PTC device; 112—PTC component; 114—substrate side lead; 116—cell side lead; 118—PTC element; 120—metal electrode; 122—metal electrode; 124—electrically conductive connection part; 126—oxygen barrier layer.

What is claimed is:

1. A PTC device which comprises a plurality of laminar PTC components which are laminated via an insulation layer, said PTC device having a first end portion and a second end portion, characterized in that:
    each PTC component comprises a PTC element which is defined by a first main surface and a second main surface facing each other, and which is terminated at the first end portion and the second end portion; and a first laminar electrode which is disposed on the first main surface and a second laminar electrode which is disposed on the second main surface;
    the PTC device has a first side electrode which is common to the plurality of the PTC components at the first end portion and a second side electrode which is common to the plurality of the PTC components at the second end portion;

the first laminar electrode of each PTC component extends to the first end portion;
the second laminar electrode of each PTC component extends to the second end portion;
the plurality of the PTC components are connected in parallel with each other between the first side electrode and the second side electrode;
the plurality of the PTC components in the laminated state are such that the first laminar electrode is positioned as an outermost first electrode at one outermost portion of the laminated plurality of the PTC components and the second laminar electrode is positioned as the outermost second electrode at the other outermost portion of the laminated plurality of the PTC components;
a first electrically conductive element is positioned on the outside of the outermost first electrode and a second electrically conductive element is positioned on the outside of the outermost second electrode;
the first electrically conductive element is electrically connected, directly or indirectly, to the first side electrode; and
the second electrically conductive element is electrically connected, directly or indirectly, to the second side electrode, wherein a part of the insulation material is provided adjacent to at least a part of the periphery of an electrically conductive adhesive that is connected to the first laminar electrode.

2. The PTC device according to claim 1, wherein the first electrically conductive element is a metal lead which is connected to the first laminar electrode of the PTC component as the outermost first electrode with the electrically conductive adhesive positioned therebetween.

3. The PTC device according to claim 2 wherein the insulation material is provided so as to surround substantially the entire periphery of the electrically conductive adhesive.

4. The PTC device according to claim 2 wherein the second electrically conductive element is a metal layer which is formed by plating on the second laminar electrode of the PTC component as the outermost second electrode.

5. The PTC device according to claim 2 wherein the insulation layer positioned between the PTC components is a cured prepreg.

6. The PTC device according to claim 1 wherein the insulation material is provided so as to surround substantially the entire periphery of the electrically conductive adhesive.

7. The PTC device according to claim 1 wherein the second electrically conductive element is a metal layer which is formed by plating on the second laminar electrode of the PTC component as the outermost second electrode.

8. The PTC device according to claim 1 wherein the insulation layer positioned between the PTC components is a cured prepreg.

9. The PTC device according to claim 1 wherein the second electrically conductive element is a metal layer which is formed by plating on the second laminar electrode of the PTC component as the outermost second electrode.

10. The PTC device according to claim 1 wherein the insulation layer positioned between the PTC components is a cured prepreg.

11. An electrical apparatus which is a lithium ion battery or a lithium polymer battery, said apparatus comprising
a circuit protection device comprising a PTC device which comprises a plurality of laminar PTC components which are laminated via an insulation layer, said PTC device having a first end portion and a second end portion, characterized in that:
each PTC component comprises a PTC element which is defined by a first main surface and a second main surface facing each other, and which is terminated at the first end portion and the second end portion; and a first laminar electrode which is disposed on the first main surface and a second laminar electrode which is disposed on the second main surface;
the PTC device has a first side electrode which is common to the plurality of the PTC components at the first end portion and a second side electrode which is common to the plurality of the PTC components at the second end portion;
the first laminar electrode of each PTC component extends to the first end portion;
the second laminar electrode of each PTC component extends to the second end portion;
the plurality of the PTC components are connected in parallel with each other between the first side electrode and the second side electrode;
the plurality of the PTC components in the laminated state are such that the first laminar electrode is positioned as an outermost first electrode at one outermost portion of the laminated plurality of the PTC components and the second laminar electrode is positioned as the outermost second electrode at the other outermost portion of the laminated plurality of the PTC components;
a first electrically conductive element is positioned on the outside of the outermost first electrode and a second electrically conductive element is positioned on the outside of the outermost second electrode;
the first electrically conductive element is electrically connected, directly or indirectly, to the first side electrode; and
the second electrically conductive element is electrically connected, directly or indirectly, to the second side electrode,
wherein a part of the insulation material is provided adjacent to at least a part of the periphery of an electrically conductive adhesive that is connected to the first laminar electrode.

12. The electrical apparatus according to claim 11, wherein the first electrically conductive element is a metal lead which is connected to the first laminar electrode of the PTC component as the outermost first electrode with the electrically conductive adhesive positioned therebetween.

13. The electrical apparatus according to claim 11, wherein the insulation material is provided so as to surround substantially the entire periphery of the electrically conductive adhesive.

14. The electrical apparatus according to claim 11, wherein the second electrically conductive element is a metal layer which is formed by plating on the second laminar electrode of the PTC component as the outermost second electrode.

15. The electrical apparatus according to claim 11, wherein the insulation layer positioned between the PTC components is a cured prepreg.

* * * * *